US008279103B2

(12) United States Patent
Chuang et al.

(10) Patent No.: US 8,279,103 B2
(45) Date of Patent: Oct. 2, 2012

(54) REMOTE CONTROL DEVICE AND REMOTE CONTROL METHOD THEREOF

(75) Inventors: Ko-Chien Chuang, Taipei (TW); Wei-Tsun Lee, Taipei County (TW); Ching-Hui Chiu, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 363 days.

(21) Appl. No.: 12/789,083

(22) Filed: May 27, 2010

(65) Prior Publication Data

US 2011/0012772 A1 Jan. 20, 2011

(30) Foreign Application Priority Data

Jul. 16, 2009 (TW) ............................... 98124119 A

(51) Int. Cl.
*H04L 17/02* (2006.01)

(52) U.S. Cl. ...................................... 341/176; 340/12.3

(58) Field of Classification Search .................. 341/176, 341/173; 340/12.3, 12.52, 825.71, 825.72, 340/539.11; 455/3.06, 41.2, 456.1, 420, 455/418, 419, 435.1, 404.2

See application file for complete search history.

(56) References Cited

U.S. PATENT DOCUMENTS

| | | | | |
|---|---|---|---|---|
| 8,058,975 | B2 * | 11/2011 | Barnardo et al. | 340/12.3 |
| 2006/0256082 | A1 | 11/2006 | Cho et al. | |

* cited by examiner

*Primary Examiner* — Joseph Lauture

(74) *Attorney, Agent, or Firm* — Rabin & Berdo, P.C.

(57) ABSTRACT

A remote control device and a remote control method thereof are provided. The remote control method is adapted to a remote control device, which includes a sensing unit for generating remote controlling signals while shaking the remote control device. The remote control method includes the following steps. Firstly, a series of sensing signal is provided by the sensing unit. Next, a series of reference value is generated according to the series of sensing signal. Then, when to start/stop to store the series sensing signal is determined according to the series of reference value. Afterwards, the series of sensing signal is recognized for generating the remote controlling signal. Finally, the remote controlling signal is transmitted.

20 Claims, 4 Drawing Sheets

REMOTE CONTROL DEVICE AND REMOTE CONTROL METHOD THEREOF

This application claims the benefit of Taiwan application Serial No. 98124119, filed Jul. 16, 2009, the subject matter of which is incorporated herein by reference.

BACKGROUND OF THE INVENTION

1. Field of the Invention

The invention relates in general to a remote control device and a remote control method thereof, and more particularly to a remote control device performing gesture to select a corresponding remote control function by shaking the remote control device and a remote control method thereof.

2. Description of the Related Art

With the rapid advance in science and technology, electronic devices have gained great popularity, and people are becoming more and more dependent on electronic devices such as TV, video recorder/player, multi-media AV device. In order to control electronic devices at a distance from the user, remote control devices are provided for the user to select a corresponding remote control function, such as previous/next channels, adjusting sound volume or switching channels, with the key on the remote control device.

For generally known remote control devices, the user remotely controls electronic devices by pressing the keys on the remote control device. Thus, if the user would like to switching channels, adjusting volume or switching to previous/next channels, the user needs to look at the remote control device, select the corresponding of the desired function, and then presses the key to remotely control the electronic device.

SUMMARY OF THE INVENTION

The invention is directed to a remote control device and a remote control method thereof capable of determining when to store the input data transformed from the sensing signal provided by an inertial sensing unit, and matching a corresponding remote control function according to the input data to remotely control an electronic device, so that the user can perform the required remote control function through a gesture by shaking the remote control device. Thus, the convenience in use is enhanced.

According to a first aspect of the present invention, a remote control device is provided. The remote control device is for generating remote controlling signals while shaking the remote control device. The remote control device includes a storing unit, a communication unit, a sensing unit and a processing unit. The sensing unit is for providing a series of sensing signal. The processing unit is for generating a series of reference value according to the series of sensing signal. The processing unit determines when to start/stop to store the series of sensing signal to the storing unit according to the series of reference value. The series of reference value is greater than a threshold during a period between a first timing and a second timing but smaller than the threshold during a period between the second timing and a third timing. The processing unit recognizes the series of sensing signal for generating the remote controlling signal, and further drives the communication unit to transmit the remote controlling signal.

According to a second aspect of the present invention, a remote control method adapted to a remote control device is provided. The remote control device includes a sensing unit for generating a remote controlling signal while shaking the remote control device. The remote control method includes the following steps. First, a series of sensing signal is provided by the sensing unit. Next, a series of reference value is generated according to the series of sensing signal. Then, when to start/stop to store the series of sensing signal is determined according to the series of reference value. Afterwards, the series of sensing signal is recognized for generating the remote controlling signal. Finally, the remote controlling signal is transmitted. The series of reference value is greater than a threshold during a period between a first timing and a second timing but smaller than the threshold between the second timing and a third timing.

The invention will become apparent from the following detailed description of the preferred but non-limiting embodiments. The following description is made with reference to the accompanying drawings.

DETAILED DESCRIPTION OF THE INVENTION

A remote control device is disclosed in an embodiment of the invention, which is equipped an inertial sensing unit for providing a sensing signal by shaking or moving the remote control device, a processing unit, according to the sensing signal, for determining when to start/stop to store the sensing signal and transformed input data, recognizing the stored input data to generate a remote controlling signal, and further transmitting the remote controlling signal to an electronic device at remote end to perform a remote control function corresponding to remote controlling signal. Examples of the electronic device include TV and video recorder/player, and examples of the remote control function include power controlling, channel switching, and volume adjusting. The present embodiment of the invention performs remote control according to the user's gesture, hence significantly increasing the convenience in use. In the present embodiment of the invention, the gesture refers to that the sensing signal is generated first by the user's physically shaking the remote control device and then the sensing signal is further processed and identified to perform remote control function, instead of determining the gesture directly.

Figure 1:
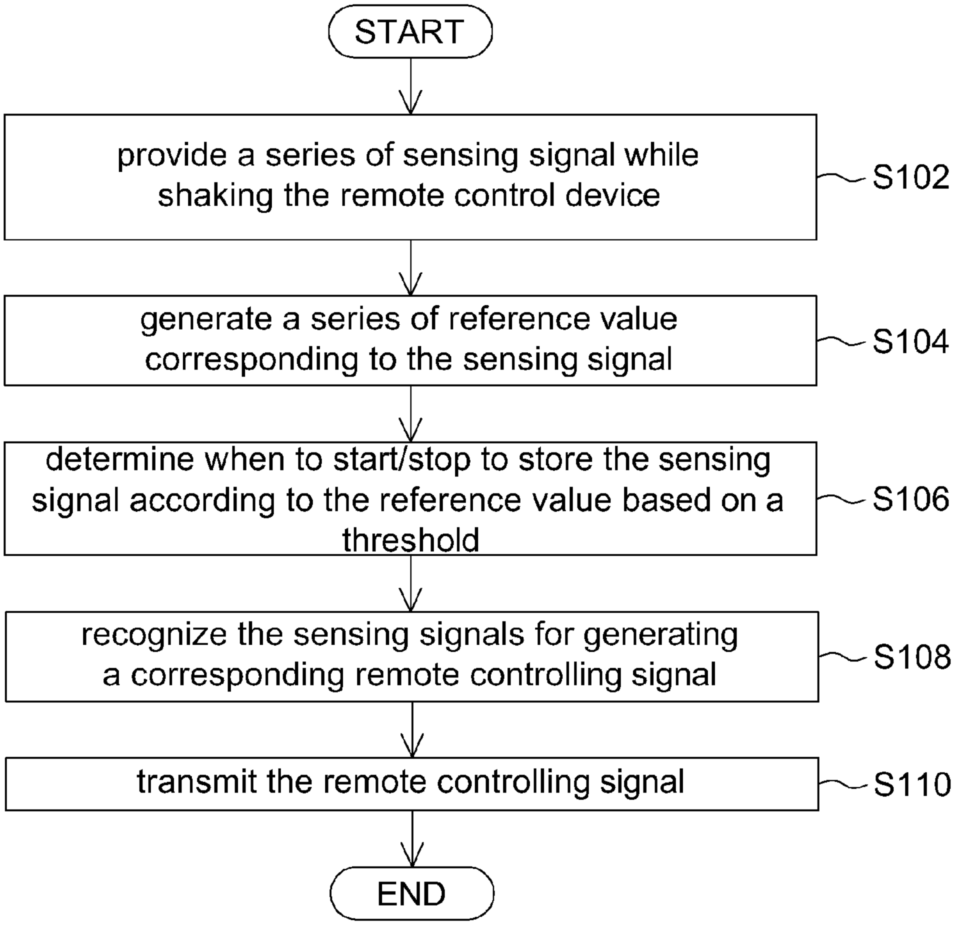
FIG. 1 shows a flowchart of a remote control method according to an embodiment of the invention.

Referring to FIG. 1, a flowchart of a remote control method according to an embodiment of the invention is shown. The method is adapted to a remote control device for generating a remote controlling signal by shaking the remote control device. The method includes the following steps.

Firstly, the method begins at step S102, a series of sensing signal (referred to hereafter as the sensing signal) is provided by the sensing unit while shaking the remote control device (i.e. user's gesture). Next, the method proceeds to step S104, a series of reference value (referred to hereafter as the reference value) is generated corresponding to the sensing signal. Afterwards, the method proceeds to step S106, when to start/stop to store the sensing signal is determined according to the reference value based on a threshold. Then, the method proceeds to step S108, the sensing signal is recognized for generating a corresponding remote controlling signal. Next, the method proceeds to step S110, the remote controlling signal is transmitted.

Figure 2:
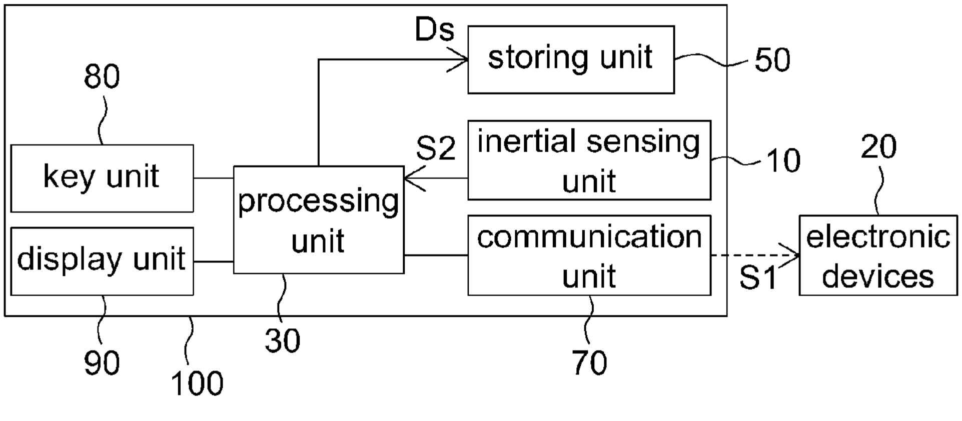
FIG. 2 shows an example of a block diagram of the remote control device using the remote control method of FIG. 1.
Figure 3:
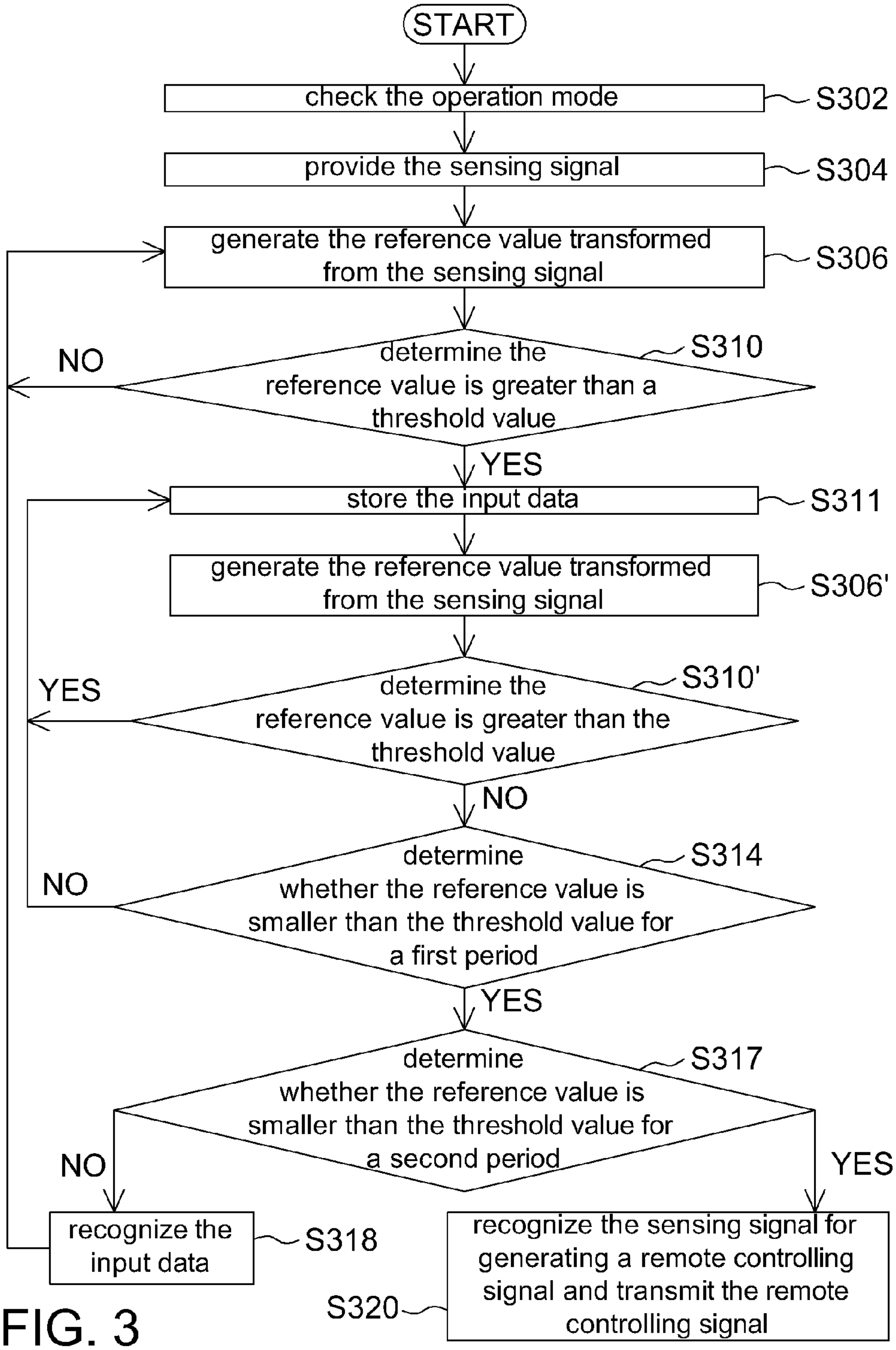
FIG. 3 shows a detailed flowchart of an embodiment according to the remote control method of FIG. 1.

The detailed steps of the remote control method are disclosed below. Referring to FIG. 2 and FIG. 3. FIG. 2 shows an example of a block diagram of the remote control device using the remote control method of FIG. 1. FIG. 3 shows a detailed flowchart of an embodiment according to the remote control method of FIG. 1. Anyone who is skilled in the technology of the invention will understand that the remote control method is not limited to be used in the remote control device of FIG. 2, and the steps and sequences of the remote control method can be adjusted or modified according to actual needs.

The remote control device 100 generates a remote controlling signal S1 while shaking the remote control device by a user, and then the remote controlling signal S1 is transmitted to an electronic devices 20 capable of receiving the remote controlling signal S1 for performing a remote control function corresponding to the remote controlling signal S1. The remote control device 100 can be used in TV remote controller, game controller, or embedded in portable electronic devices such as personal digital assistant (PDA), mobile phone, or audio player such as MPEG-1 audio player 3 (MP 3), MPEG-4 Part 14 (MP4) player.

In FIG. 2, the remote control device 100 includes an inertial sensing unit 10, a processing unit 30, a storing unit 50, a communication unit 70, a key unit 80, and a display unit 90. The sensing unit 10, as long as being able to generate a sensing signal S2, such as acceleration value or speed value, is used to responses to the shaking. In the present embodiment of the invention, the sensing signal generated by the sensing unit 10 is acceleration value. Besides, the key unit 80 and the display unit 90 can be optionally disposed according to actual needs. The storing unit 50 stores several groups of pre-stored data for recognition purpose, and stores the sensing signal S2 generated by the inertial sensing unit 10.

As indicated in FIG. 3, the method begins at step S302, and the processing unit 30 first checks the operation mode of the remote control device 100 in the storing unit 50. The storing unit 50, such as a built-in component or an external component, can be a memory built in the processing unit 30. Different electronic devices 20, such as TV, video recorder/player or game station corresponds different operation mode which in turns correspond to respectively communication protocols. A default operation mode can be stored in the storing unit 50, which would be loaded as long as the remote control device 100 is turned on. Besides, the setting of operation mode of the remote control device 100 just before turned off also could be stored, and once the remote control device 100 is turned on again, the stored operation mode could be loaded.

In practical application, the processing unit 30 drives the communication unit 70 to transmit the remote controlling signal S1 according to the operation mode. In a preferred embodiment, the communication unit 70 supports Bluetooth protocol, infrared data association (IrDA) protocol, or wireless fidelity (WiFi) protocol. The remote control device 100 can select the protocols supported by the communication unit 70 according to the target electronic device 20. For example, when the user uses the remote control device 100 to communicate with TV or video recorder/player equipped with IrDA protocol, the remote controlling signal S1 transmitted by the communication unit 70 has to be formatted to conform or meet to IrDA protocol. Besides, if the user uses the remote control device 100 to communicate with the electronic devices 20 equipped with Bluetooth or WiFi protocol (such as a game station), the user can press the key unit 80 of the remote control device 100 to switch the format of the remote controlling signal S1 to meet Bluetooth or WiFi protocol of the communication protocol of the electronic devices 20. Thus, the remote control device 100 can be operated in different operation mode to accommodate various remote control devices 100.

Afterwards, the method proceeds to step S304, the sensing signal S2 is provided by the sensing unit 10 while shaking the remote control device 100. In practical application, each sensing signal S2 is provided at regular interval. In an embodiment, the sensing unit 10 may include an accelerometer and the sensing signal S2 provided by the sensing unit 10 may include three-axial acceleration signals corresponding to the remote control device 100 in the space.

Then, the method proceeds to step S306, the sensing signal S2 is transformed to various series of reference values by the processing unit 30. In an embodiment, one of the reference values can be but not limited to a series of speed value (referred to hereafter as the speed value), acceleration value, energy value or other representations according to the actual requirement.

In the embodiment, takes speed value as reference value. After receiving the sensing signal S2 (such as the three-axial signal corresponding to the remote control device 100 in the space), the processing unit 100 generates the speed value from the sensing signal through the following formulas:

$$V = \frac{1}{n^2} S \times L; \quad \text{(Formula 1)}$$

$$S = \sum_{i=0}^{n} a_{x(i)}^2 + \sum_{i=0}^{n} a_{y(i)}^2 + \sum_{i=0}^{n} a_{z(i)}^2; \quad \text{(Formula 2)}$$

$$L = \sum_{i=0}^{n} |a_{x(i)}| + \sum_{i=0}^{n} |a_{y(i)}| + \sum_{i=0}^{n} |a_{z(i)}|; \quad \text{(Formula 3)}$$

Wherein V denotes speed value; x, y, and z respectively denote the three-axial signal; $a_x$, $a_y$, and $a_z$ respectively denote the acceleration values of three-axial signal obtained from the sensing unit; n, an integer greater than 0, is exemplified by 3 in an embodiment.

For example, the processing unit 30 takes the acceleration values ($a_x$, $a_y$, $a_z$) that are generated directly by the sensing signal S2 into formula 2 and formula 3 to get the value of S and L. Further, the value of S and L are taking into formula 1, thus the speed value related to the remote control device 100 is obtained. In another example, an analogy-to-digital converter can be integrated into the sensing unit 10 to provide digitalized sensing signal or acceleration value to the processing unit 30 to generate speed value based on the above formulas.

Afterwards, the method proceeds to step S310. In step S310, the sensing signal S2 (i.e. acceleration value), generated due to unintended collision or shaking, would be excluded to avoid erroneous result, otherwise input data Ds, including sensing signal S2 and the speed value, would be stored in the storing unit 50.

For example, in step S310, once the speed value is greater than a threshold, the storing unit 50 is driven to start to store the input data Ds by the processing unit 30 in step S311, which means that the user is intended to shake the remote control device 100 to do a remote control; otherwise, the method repeats step S306, which means that the shaking is not intentionally generated by the user (i.e. the sensing signal S2 is not desired). It is noted that, the input data Ds and t the operation mode can be stored in the same or separate storing units.

Figure 4:
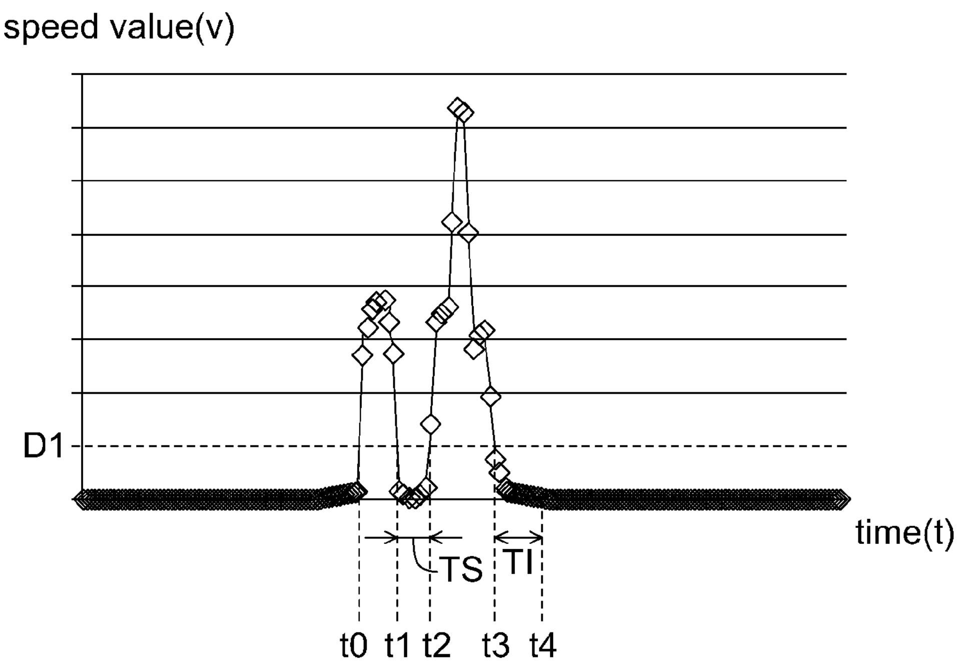
FIG. 4 shows an example of the speed value generated from the sensing signal.

Referring to FIG. 4, an example of the speed value related to the remote control device 100 is shown. The horizontal coordinate denotes time t, and the vertical coordinate denotes speed value V. In the example of FIG. 4, the speed value V (t) can be transformed form the sensing signal S2 by the processing unit 30. The present embodiment of the invention adopts the threshold D1 for example. As indicated in FIG. 4, once the speed value V (t0) is greater than the threshold D1 at time t0 (referred to hereafter as the first timing), the input data Ds starts to be stored to the storing unit 50.

Then, the method proceeds to step S306', the processing unit 30 continues to transform next sensing signal S2 into speed value V and determines whether the speed value V is greater than the threshold in step S310'. If the speed value is greater than the threshold, then step S311 is repeated until the speed value is not greater than the threshold.

When the user shakes the remote control device to draw a single digit or motion, the digit is usually accompanied with a sharp turning motion depending on the digit, such as "2" or "3", which may cause the speed value V to be smaller than the threshold D1 for a short instance and then promptly rebound back. One clear characteristic of the "sharp turning motion" causing the speed value V smaller than the threshold D1 is that the period lasts a very short time. That is, when the user shakes the remote control device 100 to draw digit "2", the speed value smaller than the threshold D1 will last a short time. If the speed value smaller than the threshold D1 is discarded, misjudgment will occur in subsequent step of recognition. Thus, Step S310' and step S314 are used together to avoid the occurrence of above misjudgment.

It is noted that the difference between step S306 and step S306' and the difference between step S310 and step S310' is that step S306 and step S310 are used at the initial stage before any input data is stored, therefore there is no need to consider the speed value V being smaller than the threshold D1 but meaningful information. Any speed value that is smaller than the threshold at the initial stage would be considered as noises and discarded accordingly. However, in step S306' and step S310', the input data have been stored to the storing unit 50 already, whether the speed value V being smaller than the threshold D1 but meaningful information have to be determined (i.e. determine the existence of turning motion of a digit). In step S310, if it is determined that the speed value is not greater than the threshold, no further process is performed (i.e. the speed value is ignored or discarded) and returns to step S306 to continue to determine the next sensing signal. In step S310', if it is determined that the reference value is not greater than the threshold, the method still needs to proceed to step S314 to determine whether the speed value is meaningful information.

In an embodiment, the processing unit 30 determines that the reference value is meaningful information according to a first pre-determined condition based on the characteristic of the sharp turning motion that the period of "the speed value V smaller than the threshold D1" lasts a very short time. In an embodiment, the processing unit 30 proceeds to step S314 to determine whether the speed value V satisfy the first pre-determined condition. In step S314, the processing unit 30 determines whether the period during which the speed value V smaller than the threshold is longer than a first period. If yes, the processing unit 30 determines that the first pre-determined condition is satisfied, which means that the shaking or drawing of the single digit may finish (because the period does not conform to the characteristics) instead of occurrence of the turning motion. If no, the method repeats step S311, which means that, the turning motion occurs (because the period is short and conforms to the characteristics), and the input data Ds during the period have to be stored. Then, the method returns to step S306' to process the next sensing signal.

Referring to FIG. 4. After storing the input data Ds at time t0, the processing unit 30 would repeat step S311 to step S310' until time t1 (referred to hereafter as the second timing), when the speed value V is smaller than the threshold D1 until time t2. Then, the processing unit 30 further determines whether the period TS between time t1 and time t2 is longer than the first period. In practical application, the first period is 0.5 seconds for example. If the period TS between time t1 and time t2 is shorter than the first period, the processing unit 30 determines that the first pre-determined condition is not satisfied and judge that the period TS is meaningful information due to turning motion, and then drive the storing unit 50 to store the input data Ds to the storing unit 50.

If the processing unit 30 determines that the first pre-determined condition is satisfied (i.e., the period TS is longer than the first period), this implies that the drawing of the single digit finishes. It is noted that when the processing unit 30 determines that the drawing of the single digit (such as digit "2") finishes, this does not implies that the user complete gesture because the user may continue to draw another digit (such as digit "3") to form a combined digits consisting of several digits such as digit "23" for switching to channel "23". In other words, the period TS is generated due to the interval while shaking two sequent digits of combined digits. Therefore, in step 314, when the processing unit 30 determines that the drawing of the single digit finishes, the method further proceeds to step 317 to determine whether a second pre-determined condition is satisfied so as to determine whether the input data Ds is combined digits instead of transmitting the remote controlling signal S1 with the single digit to the electronic devices 20 immediately, hence avoiding misjudgment.

The processing unit 30 determines whether the second pre-determined condition is satisfied in step S317 based on whether the period TS is longer than a second period. If yes, the processing unit 30 determines that the second pre-determined condition is satisfied, which means completion of the gesture with single digit, and then the method proceeds to step S320 to recognize the stored input data, generate a corresponding remote controlling signal, and drive the communication unit 70 to transmit the corresponding remote controlling signal. If no, the method proceeds to step S318, the input data previously stored (i.e. the first digit of a combined gesture) is recognized without transmitting, and then step S306 is repeated. This implies that the gesture is not yet complete (i.e. combined digits).

For example, if the period between the second timing and the third timing is longer than both the first period and the second period (that is, the user completer the gesture), the processing unit 30 would recognize the sensing signal between the first timing and the second timing stored in the storing unit 50 to generate a remote controlling signal, and drive the communication unit 70 to transmit the remote controlling signal.

Referring to FIG. 4, the speed value V is smaller than the threshold D1 during period TI between time t3 (referred to hereafter as the fourth timing) and time t4 (referred to hereafter as the fifth timing). Once the speed value V is smaller than the threshold D1, the processing unit 30 would compare the period TI to the first period in step S314 to verify the existence of turning motion. If the period TI is longer than the first period, the processing unit 30 proceeds to step S317 to compare the period TI to the second period to verify whether the current gesture is complete. If the period TI is longer than the second period, it implies that the gesture is complete, and then the processing unit 30 drives the communication unit 70 to transmit a corresponding remote controlling signal.

In the exemplification of FIG. 4, the processing unit 30 starts to store input data Ds from time t0 and stops storing input data at time t4. Despite the speed value is smaller than the threshold D1 during the period TS, the processing unit 30 does not stop storing the input data Ds at time t1 immediately, however the processing unit 30 judges those meaningful. Besides, the processing unit 30 further judge the speed value V during the period TI to decide to stop storing the input data based on comparison of the period TI, the first period and the second period. Thus, with the first period and the second period, the processing unit 30 may filter the speed value V to obtain desired input data Ds and avoid failure recognition or errors.

Afterwards, if the period TI is not longer than the second period, then step S318 is performed for recognizing the input data Ds stored in the storing unit 50 to obtain the first single digit of the combined digits, and then proceeds to step S306 for the follow-up second digit. Finally, once the period TI is longer than the second period during the period of recognizing the second digit, the processing unit 30 would combine the first digit and the second digit as a controlling signal S1 with combined digits, which would be transmitted to the electronic devices 20 through the communication unit 70. The present embodiment of the invention is exemplified by two digits, however, more than two digits or motions can be combined and transmitted, whose procedures are the same as the above exemplification.

Figure 5:
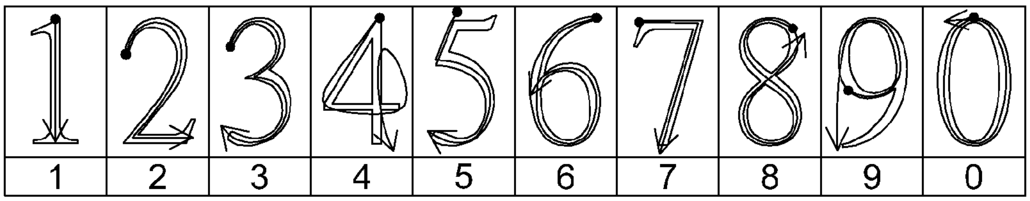
FIG. 5 shows an example of remote controlling signals with related digits generated according to different gestures.

An example is given below for elaborating steps S318~320. FIG. 5 shows an example of remote controlling signals with related digits generated by the user's gestures. During the recognition process, the processing unit 30 compares the stored input data to each group of pre-stored data in the storing unit 50. Each group of pre-stored data corresponds to a digit. The processing unit 30 calculates a plural of matching rates (i.e. 10 matching rates due to digit 0~digit 9) by comparing the stored input data to each group of pre-stored data respectively. Then, the processing unit 30 will decide one digit from the 10 matching rates based on the group of pre-stored data having highest matching rate with the input data, and then perform a corresponding remote control function.

Figure 6A:
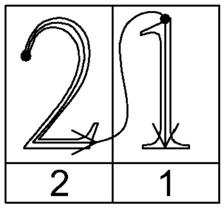
FIG. 6A shows an example of a gesture composed of digits "2" and "1" of FIG. 5.
Figure 6B:
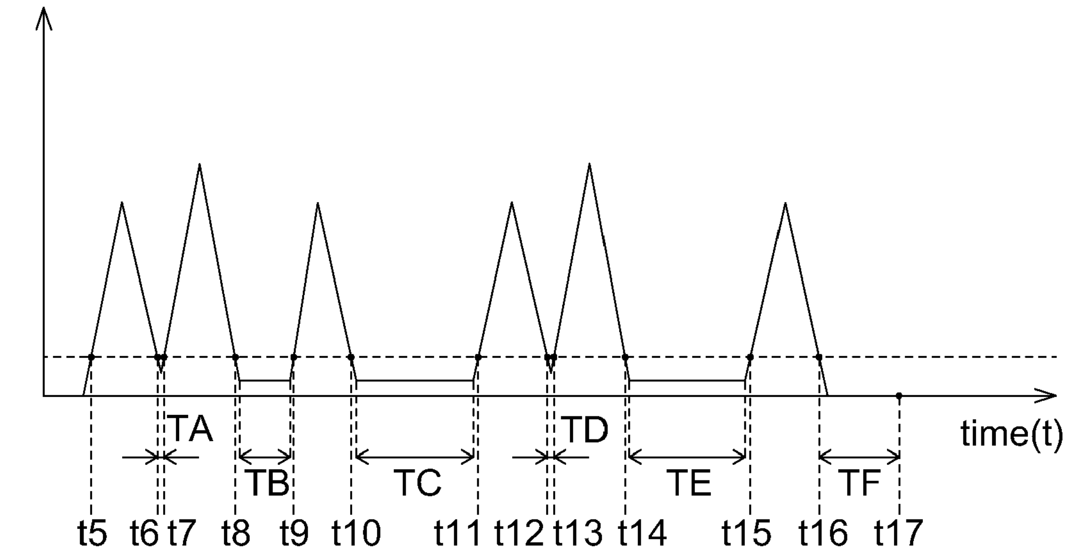
FIG. 6B shows an example of the speed value generated from the sensing signal according to the combined gesture and non-combined gesture of FIG. 6A.

Please referring to FIG. 6A and FIG. 6B. FIG. 6A shows an example of a combined digits composed of digits "2" and "1" in FIG. 5. FIG. 6B shows an example of the speed value transformed from the sensing signal S2 by shaking a gesture with the combined digits in FIG. 6A. The horizontal coordinate denotes time t; the vertical coordinate denotes the speed value V. The speed value V from time t5 to time t8 is generated by shaking the remote control device 100 to draw the digit "2". The speed value V from time t9 to time t10 is generated by shaking the remote control device 100 to draw the digit "1". The period TB between time t8 and time t9 is longer than the first period but shorter than the second period. The period TC between time t10 and time t11 is longer than the second period. The first period is, for example, 0.5 second, and the second period is, for example, 1 second, wherein the second period is greater than the first period.

In FIG. 6B, once the speed value V is greater than the threshold D1 at time t5, the processing unit 30 starts to store the input data until time t6 when the speed value V is smaller than the threshold D1, this implies that the speed value before time t5 is regarded as noise. Then, the processing unit 30 judges whether the period TA between time t5 and time t7, during which the speed value V is smaller than the threshold D1, is longer than the first period (such as 0.5 second). The processing unit 30 would determine that the period TA is smaller than the first period D1 due to "the turning motion" of a first digit (i.e. the digit "2")) and store the input data during the period TA and keep storing until time t8 when the speed value is smaller than the threshold D1 again. The processing unit 30 would judges whether the period TB between time t8 and time t9 is longer than the first period, and determine that the period TB is greater than the first period but smaller than the second period as described previously. In details, the processing unit 30 determines the finish of the first digit and verifies the existence of the second digit based on that the period TB is longer than the first period and shorter than the second period, respectively. Meanwhile, the processing unit 30 would compare the input data between time t5 and time t8 with the pre-stored data in the storing unit 50 to recognize digit "2" (the first recognition result). So far, the processing unit 30 determines that the user shakes the remote control device to draw a gesture with combined digits, wherein the first digit of the gesture is digit "2".

Afterwards, the processing unit 30 proceeds back to step S30 to determine the second digit. As indicated in FIG. 6B, once the speed value V is greater than the threshold D1 at time t9, the processing unit 30 starts to store the input data until time t10 again when the speed value V is smaller than the threshold D1. The processing unit 30 would judge whether the period TC between time t10 and time t11, during which the speed value V is smaller than the threshold D1, is longer than the first period and the second period, and determine that the period TC is longer than the first period and the second period as described previously. In details, the processing unit 30 determines the finish of the second digit and verifies the complete of the user's gesture based on that the period TC is longer than the first period and the second period, respectively. Meanwhile, the processing unit 30 would compare the input data between time t9 and time t10 with the pre-stored data in the storing unit 50 to recognize digit "1" (the second recognition result). Finally, the processing unit 30 combines the first digit "2" and the second digit "1" to generate a remote controlling signal S1 including combined digits "21" and further transmits the remote controlling signal S1 to the electronic devices 20 so as to complete the transmission of the controlling signal.

Afterwards, as indicated in FIG. 6B, the speed value V from time t11 to time t14 is generated by shaking the remote control device 100 to draw digit "2" to perform a remote control function corresponding to digit "2". The speed value V from time 15 to time 16 is generated by shaking the remote control device 100 to draw digit "1" to activate a remote control function corresponding to digit "1". The period TD between time t12 and time t13 is smaller than the first period, the period TE between time t14 and time t15 is greater than the second period, and the period TF between time t16 to time t17 is greater than the second period.

Once the speed value V is greater than the threshold D1 at time 11, the processing unit 30 starts to store the input data until time t12 when the speed value V is smaller than the threshold D1; this implies that the speed value before time t11 is regarded as noise. Then the processing unit 30 judges whether the period TD between time t12 and time t13, during which the speed value is smaller than the threshold D1, is longer than the first period (such as 0.5 second). The processing unit 30 would determine that the period TD is smaller than the first period D1 due to "the turning motion" of a first digit, and regard the input data within the period TD is meaningful information that have to be stored and keep storing until time t14 when the speed value is smaller than the threshold D1 again. The processing unit 30 would judges whether the period TE between time t14 and time t15 is longer than the first period, and determine that the period TE is not only longer than the first period but also longer than the second period as described previously. In details, the processing unit 30 determines the finish of the first digit and verifies the complete of the user's gesture based on that the period TE is longer than the first period and the second period, respectively. Meanwhile, the processing unit 30 would compare the input data between period t11 and period t14 with the pre-stored data in the storing unit 50 to recognize digit "2", and then transmits the remote controlling signal S1 corresponding to digit "2" to the electronic devices 20 so as to complete the transmission of the controlling signal including single digit "2".

Afterwards, once the speed value V is greater than the threshold D1 at time 15, the processing unit 30 starts to store input data until time t16 when the speed value V is smaller than the threshold D1. Then, the processing unit 30 would judges whether the period TF between time t16 and time t17 is longer than the first period, and determine that the period TF is not only longer than the first period but also longer than the second period as described previously. In details, the processing unit 30 determines the finish of the first digit and verifies the complete of the user's gesture based on that the period TF is longer than the first period and the second period, respectively. Meanwhile, the processing unit 30 would compare the input data between period t15 and period t16 with the pre-stored data in the storing unit 50 to obtain digit "1". Finally, the remote controlling signal S1 corresponding to digit "1" is transmitted to the electronic devices 20 so as to complete the transmission of a controlling signal including single digit "1".

As disclosed in the above examples, based on the pre-determined threshold and periods, the present embodiment of the invention determines whether the input data is noise or meaningful information, and verify user's gesture with a single digit (such as digit "1" or "2") or combined digits (such as digits "12").

Moreover, the processing unit 30 further controls the display unit 90 to inform the user that recognition is completed and the current operation mode. The display unit 90, such as a light emitting diode (LED), informs the user through ON/OFF of a light or various LED wavelengths (colors). In another example, the display unit 90 can be an LED panel, which displays related operation modes or messages to inform the user of the current status of the remote control device.

The remote control device and the method thereof disclosed in the above embodiments of the invention have many advantages exemplified below.

(1) If the user would like to control an electronic device (such as TV) through a remote control device, the user can perform a gesture by shaking the remote control device to achieve the functions of channel switching, volume adjusting without aware of the position of the corresponding keys on the remote control device, significantly improving convenience in use.

(2) Besides, the communication unit of the remote control device supports a variety of communication protocols, such as Bluetooth protocol and WiFi protocol, for providing control signals to the game station.

(3) Moreover, the invention not only distinguishes noise from meaningful information, but also verifies the user's gesture with a single digit or combined digits, hence reducing the error of misjudgment.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote control device for generating a remote controlling signal, comprising:
  a storing unit;
  a communication unit;
  a sensing unit for providing a series of sensing signal while shaking the remote control device; and
  a processing unit for generating a series of reference value corresponding to the series of sensing signal, wherein the processing unit determines when to start/stop to store the series of sensing signal to the storing unit according to the reference value, which is greater than a threshold during a period between a first timing and a second timing but smaller than the threshold during a period between the second timing and a third timing;
  wherein the processing unit further recognizes the series of sensing signal for generating the remote controlling signal and drives the communication unit to transmit the remote controlling signal.

2. The remote control device according to claim 1, wherein the processing unit starts to store the series of sensing signal to the storing unit at the first timing.

3. The remote control device according to claim 1, wherein the processing unit determines whether the period between the second timing and the third timing is longer than a first period.

4. The remote control device according to claim 3, wherein if the processing unit determines that the period between the second timing and the third timing is longer than the first period, the processing unit further determines whether the period between the second timing and the third timing is longer than a second period which is longer than the first period.

5. The remote control device according to claim 4, wherein if the processing unit determines that the period between the second timing and the third timing is longer than the second period, the processing unit recognizes the series of sensing signal between the first timing and the second timing, generates the remote controlling signal, and drives the communication unit to transmit the remote controlling signal.

6. The remote control device according to claim 5, wherein if the processing unit determines that the period between the second timing and the third timing is shorter than the second period, the processing unit recognizes the series of sensing signal between the first timing and the second time for generating a first recognition result.

7. The remote control device according to claim 6, wherein the series of reference value is greater than the threshold during a period between the third timing and a fourth timing but smaller than the threshold during a period between the fourth timing and a fifth timing, and the processing unit determines whether the period between the fourth timing and the fifth timing is longer than the first period.

8. The remote control device according to claim 7, wherein if the processing unit determines that the period between the fourth timing and the fifth timing is longer than the first period, the processing unit further determines whether the period between the fourth timing and the fifth timing is longer than the second period.

9. The remote control device according to claim 8, wherein if the processing unit determines that the period between the fourth timing and the fifth timing is longer than the second period, the processing unit recognizes the sensing signal between the third timing and the fourth timing to obtain a second recognition result, generates the remote controlling signal combining the first recognition result and the second recognition result, and drives the communication unit to transmit the remote controlling signal.

10. The remote control device according to claim 3, wherein the series of reference value is greater than the threshold between the third timing and a fourth timing but smaller than the threshold between the fourth timing and a fifth timing, and if the processing unit determines that the period between the second timing and the third timing is shorter than the first period, the processing unit further determines whether the period between the fourth timing and the fifth timing is longer than the first period.

11. The remote control device according to claim 10, wherein if the processing unit determines that the period between the fourth timing and the fifth timing is longer than the first period, the processing unit further determine whether the period between the fourth timing and the fifth timing is longer than the second period, which is longer than the first period.

12. The remote control device according to claim 11, wherein if the processing unit determines that the period between the fourth timing and the fifth timing is longer than the second period, the processing unit recognizes the sensing signal between the first timing and the fourth time, generates the remote controlling signal, and drives the communication unit to transmit the remote controlling signal.

13. The remote control device according to claim 1, wherein the sensing unit comprises an accelerometer.

14. The remote control device according to claim 1, further comprising:

a key unit;

wherein the processing unit determines whether the key unit is activated and accordingly updating an operation mode, and once the operation mode is updated, the processing unit further controls the communication unit to transmit the remote controlling signal according to the updated operation mode.

15. The remote control device according to claim 14, further comprising:

a display unit for displaying the operation mode.

16. A remote control method adapted to a remote control device, wherein the remote control device comprises a sensing unit for generating a remote controlling signal while shaking the remote control device, the method comprises:

providing a series of sensing signal by the sensing unit;

generating a series of reference value corresponding to the series of sensing signal;

determining when to start/stop to store the series of sensing signal according to the series of reference value;

recognizing the series of sensing signal for generating the remote controlling signal; and transmitting the remote controlling signal;

wherein the series reference value is greater than a threshold during a period between a first timing and a second timing but smaller than the threshold during a period between the second timing and a third timing.

17. The remote control method according to claim 16, wherein the processing unit starts to store the series of sensing signal from the first timing.

18. The remote control method according to claim 17, wherein the processing unit determines whether the period between the second timing and the third timing is longer than a first period.

19. The remote control method according to claim 18, wherein if the processing unit determines that the period between the second timing and the third timing is longer than the first period, the processing unit further determines whether the period between the second timing and the third timing is longer than a second period, which is longer than the first period.

20. The remote control method according to claim 19, wherein if the processing unit determines that the period between the second timing and the third timing is longer than the second period, the processing unit recognizes the sensing signal stored in the storing unit between the first timing and the second time for generating the remote controlling signal.

* * * * *